United States Patent [19]

Aguilera et al.

[11] Patent Number: 5,680,439
[45] Date of Patent: Oct. 21, 1997

[54] FIXED CELLULAR TECHNICAL WITH A DISTINCTIVE DIAL TONE TO INDICATE AN EMERGENCY CALL IS BEING PLACED

[75] Inventors: Jose Maria Garcia Aguilera, Madrid; Francisco Javier Leon Rubio, Puerto de Sagunto; Ramiro Ramirez Ramirez, San Sebastian de Los Reyes, all of Spain

[73] Assignee: Alcatel N.V., Netherlands

[21] Appl. No.: 430,810

[22] Filed: Apr. 28, 1995

[30] Foreign Application Priority Data

Apr. 29, 1994 [ES] Spain ................................ 9400917

[51] Int. Cl.⁶ .......................... H04M 11/00; H04M 9/00; H04M 11/04; H04Q 7/00
[52] U.S. Cl. ........................ 379/58; 379/40; 379/62; 379/65; 379/45
[58] Field of Search ...................... 379/58, 59, 50, 379/40, 45; 455/33.1

[56] References Cited

U.S. PATENT DOCUMENTS

| | | | |
|---|---|---|---|
| 4,658,096 | 4/1987 | West, Jr. et al. | 379/59 |
| 4,724,538 | 2/1988 | Farrell | 379/45 X |
| 5,016,269 | 5/1991 | Rogers | 379/59 |
| 5,161,180 | 11/1992 | Chavous | 379/50 X |
| 5,203,009 | 4/1993 | Bogusz et al. | 455/33.1 |
| 5,377,256 | 12/1994 | Franklin et al. | 379/59 |

FOREIGN PATENT DOCUMENTS 059314  11/1993  European Pat. Off. .

OTHER PUBLICATIONS

"Application of mobile technology in the access network" by J.M. Garcia Aguilera, published in the Workshop Proceedings of the 23rd European Microwave Conference held in Madrid on Sep. 10, 1993, pp. 124–125.

Primary Examiner—Dwayne Bost
Assistant Examiner—Scott Richardson
Attorney, Agent, or Firm—Ware, Fressola, Van Der Sluys & Adolphson

[57] ABSTRACT

Of special application in cellular mobile networks that communicate this terminal, via radio, with a base station to provide services of voice and/or data communications to a number of subscribers and which, in addition to the basic communications service, also support an emergency call service performed through the terminal in question by dialling a certain number. This terminal comprises means (41) for generating user signalling tones and which also generate an emergency call dial tone, different from the other tones already present, when a call process is initiated by the subscriber (5) in the case where the fixed cellular terminal is only capable of making emergency calls.

7 Claims, 2 Drawing Sheets

FIXED CELLULAR TECHNICAL WITH A DISTINCTIVE DIAL TONE TO INDICATE AN EMERGENCY CALL IS BEING PLACED

TECHNICAL FIELD

This invention concerns a fixed cellular terminal for use in cellular mobile communications networks that offer services of voice and/or data to a number of terminals either of the telephone type or of any other type, being particularly useful in those environments where there is still no fixed communications infrastructure, or where the fixed communications infrastructure has become saturated and it is planned to form an operational "island" to which this communications service can be offered.

The equipment described herein, is of particular application in fixed communications services based on systems of cellular mobile coverage of the GSM type.

BACKGROUND TO THE INVENTION

The use of cellular mobile systems with "fixed mobility" as part of the infrastructure of the basic telephone service is of great attraction in those situations where the installation of a fixed conventional infrastructure cannot pay for itself because of the low subscriber density.

In such situations telephone operators can make use of radio coverage offered by cellular mobile systems in order to provide the basic telephone service through an appropriate interface. This requires the design of a special simplified terminal with respect to the features offered by a standard one, and of a special processing facility for this terminal on the fixed side of the mobile switching exchange (elimination of the mobility functions, etc.).

In the article "Application of mobile technology in the access network" by J. M. García Aguilera, published in the Workshop Proceedings of the 23rd European Microwave Conference, held in Madrid on Sep. 10th, 1993, pages 124 and 125, the architecture is shown for a terminal of this type for the case of a single subscriber to the cellular system, in which the transceiver of a mobile terminal communicates with the base station of the cellular system in question, via radio, by means of a system of antennas and with an interface and control module, via cable, in order to offer a transparent line interface, from the subscriber's point of view, to the communications channel of the mobile cellular system.

According to statements made in this article, the GSM cellular network is one of the candidates for supporting this type of service.

This type of fixed cellular terminal, although having to be transparent with respect to the channel used (from the point of view of the user the telephone has to behave as if it were a terminal of the standard basic telephone service), presents certain functional differences that have to be allowed for.

First, consideration has to be given, for example, to the dial tone which, in the case of a fixed standard infrastructure, has to be sent by the exchange, so that its reception implies line availability. Nonetheless, when infrastructure is based on cellular networks, this dial tone is generated locally by the interface depending on the cellular system operational state. In cases of lines being engaged or saturated, a standard GSM terminal, once the call attempt has been made and depending on the result, generates a line busy or saturation tone that, respectively, indicates unavailability to set up the desired call.

In addition, there is a fairly frequent service in telecommunications networks and, consequently, also in mobile networks, termed "emergency call service" which the user has access to by means of dialling a predetermined number, by pressing a function key, or even by leaving the handset off-hook for a certain time. The network routes the call to the destination pre-established by the network operator (e.g. a maintenance and/or service centre).

This service is obligatory for terminals using the GSM mobile telephony standard and, by extension, a fixed cellular GSM terminal must also support this service.

The GSM terminals require the introduction of a so-called SIM board (Subscriber Identity Module) for full operation. If this board is not operational, the GSM terminal is unable to set up normal calls, since it is in the SIM that essential data are stored (mobile subscriber number, ciphering key, etc.) for the operation of the terminal.

Consequently there are situations in which the terminal cannot set up normal calls, but is capable of establishing outgoing emergency calls. This situation would not be communicated to the subscriber or subscribers that use a cellular infrastructure of this type to be connected to the public switched network, therefore he could not distinguish between a terminal that is out of service and a terminal with restricted service (only emergency calls are possible).

TECHNICAL PROBLEM TO RESOLVE

The technical problem therefore lies in resolving the ambiguous situation mentioned above in which the terminal is out of service or in a restricted service state.

This is of special importance in areas of difficult access (mountainous, etc.) where there is no other alternative means of communicating with, for example, a hospital in a situation of emergency, etc.

SUMMARY OF THE INVENTION

The terminal according to the invention is of particular application in cellular mobile networks for communicating, via radio, with at least one base station and in this way providing a voice and/or data communications service for one or more subscribers. Such cellular mobile networks, in addition to the basic communications service, also facilitate an emergency call service through the terminal. The terminal comprises means to generate user signalling tones that are transmitted to the telephone set connected to it so that it indicates line availability for dialling a number indicates a state of line occupancy or congestion, making it impossible to seize an outgoing channel in order to make the call. The fixed cellular terminal explained here is characterised in that it also generates a dial tone for emergency calls, different from the other tones already existing. This tone is generated by respective means of the corresponding line interface circuit.

Finally this invention is also characterised in that the emergency call dial tone is produced when the fixed cellular terminal only has the facilities for establishing emergency calls.

In this way, the subscriber to the basic telephone service through the provision of a fixed cellular terminal, included in the coverage zone of a base station of a cellular mobile network, can determine if the fixed cellular terminal is only equipped for making emergency calls, in contrast to the other situations that can arise in a telephone whose service is provided directly by means of the fixed network.

This type of terminal avoids situations of unreal unavailability of service and that, even with the fixed cellular terminal being in a restricted service condition for some reason, complete incommunication does not arise.

BRIEF DESCRIPTION OF THE DRAWINGS

A fuller explanation of the invention is given in the description below based on the attached figures in which.

BEST MODE FOR CARRYING OUT THE INVENTION

Figure 1:
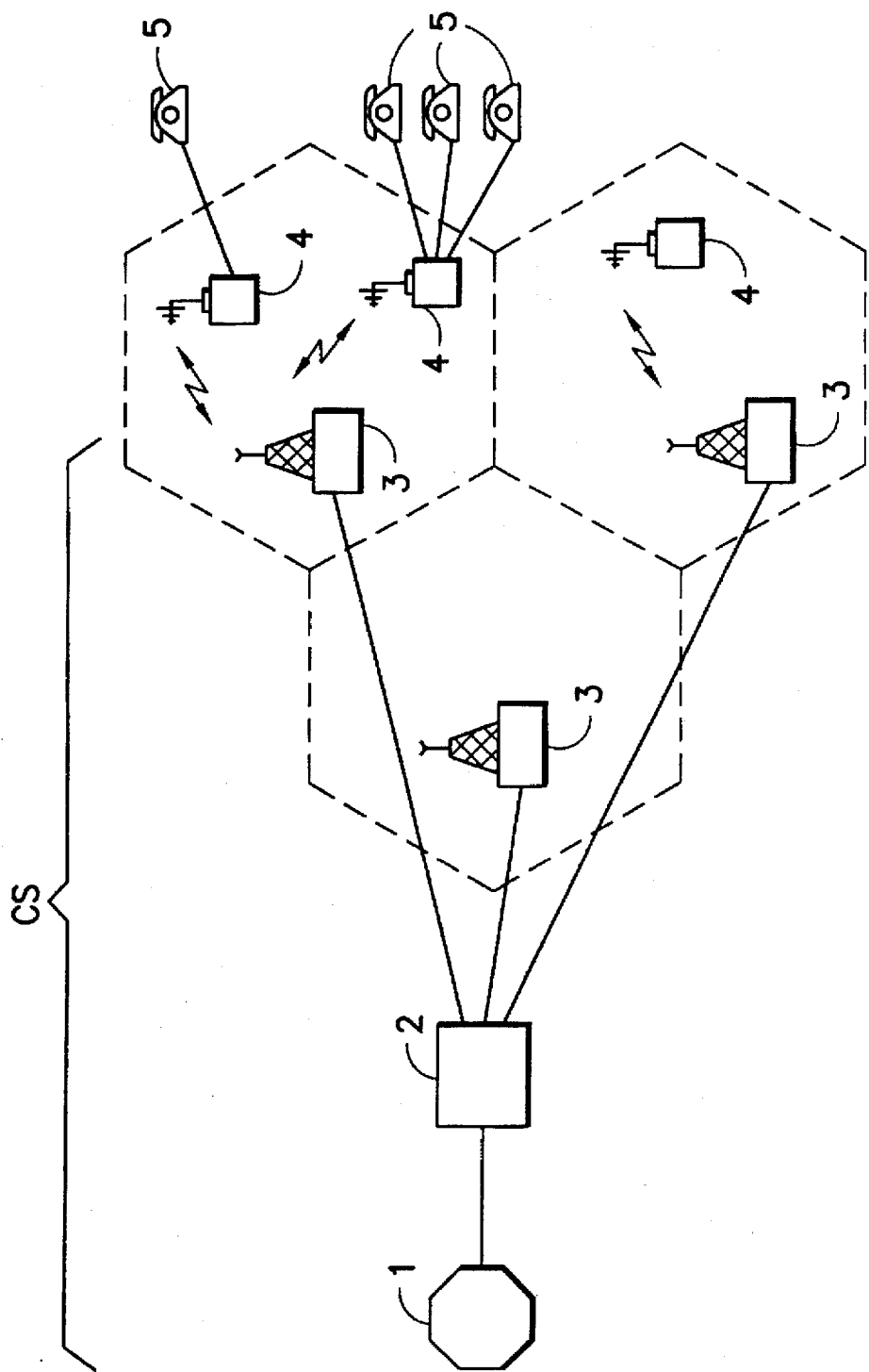
FIG. 1 illustrates the formation of a communications network based on a cellular system with fixed cellular terminals and fixed local infrastructure.

As described under the state of the art, there is a mobile cellular communications network CS formed by a mobile switching centre 2 which is connected to a communications network of greater coverage, for example, the public switched network 1. To We mobile switching centre 2 are connected to a number of base stations 3 belonging to the mobile cellular communications network CS and which are distributed over a determined zone in order to provide it with cellular coverage.

In this already existing infrastructure, it is possible to establish communications links between a mobile unit that is situated within any of the cells previously mentioned and its base station 3.

So as to use this cellular infrastructure to give service to subscribers to the basic telephone service who are widely distributed geographically, what is known as a fixed cellular terminal 4 was developed, which was derived from a mobile cellular terminal with reduced functionality. The features not applicable to the fixed cellular terminal are, for example, those relating to the characteristics of mobility, the requirement for which greatly increases the complexity of the cellular network design.

Through the inclusion of a line interface, it is possible to have a connection from one or more subscribers (subscriber terminals) 5 to this service such that the subscriber or subscribers are unaware whether they are connected directly to the public switched network 1 or if there is some intervening subsystem. To this end the fixed cellular terminal 4 has to have an interface that performs all the necessary matching so that the two wires of the line interface to which each subscriber is connected, satisfy the same physical and operational characteristics as those offered by an interface pertaining to a local exchange of the basic telephone service. All of the foregoing is well known from the state of the art.

Nevertheless, in the case of systems based on cellular networks of the GSM type, there is a terminal authentication process that prevents it from being used fraudulently by an unauthorised person. For this, it employs a small card, easily carried in a pocket, termed SIM (Subscriber Identity Module), which stores the essential data for operation of the terminal, like the mobile subscriber's number, the ciphering-deciphering key applied to the voice and/or data samples, etc. Without this card or if the card is not operational, the terminal is not capable of making calls, even when operating correctly and there are channels available. This feature creates a new situation with respect to those that occur on the normal subscriber line of the basic telephone service.

Figure 2:
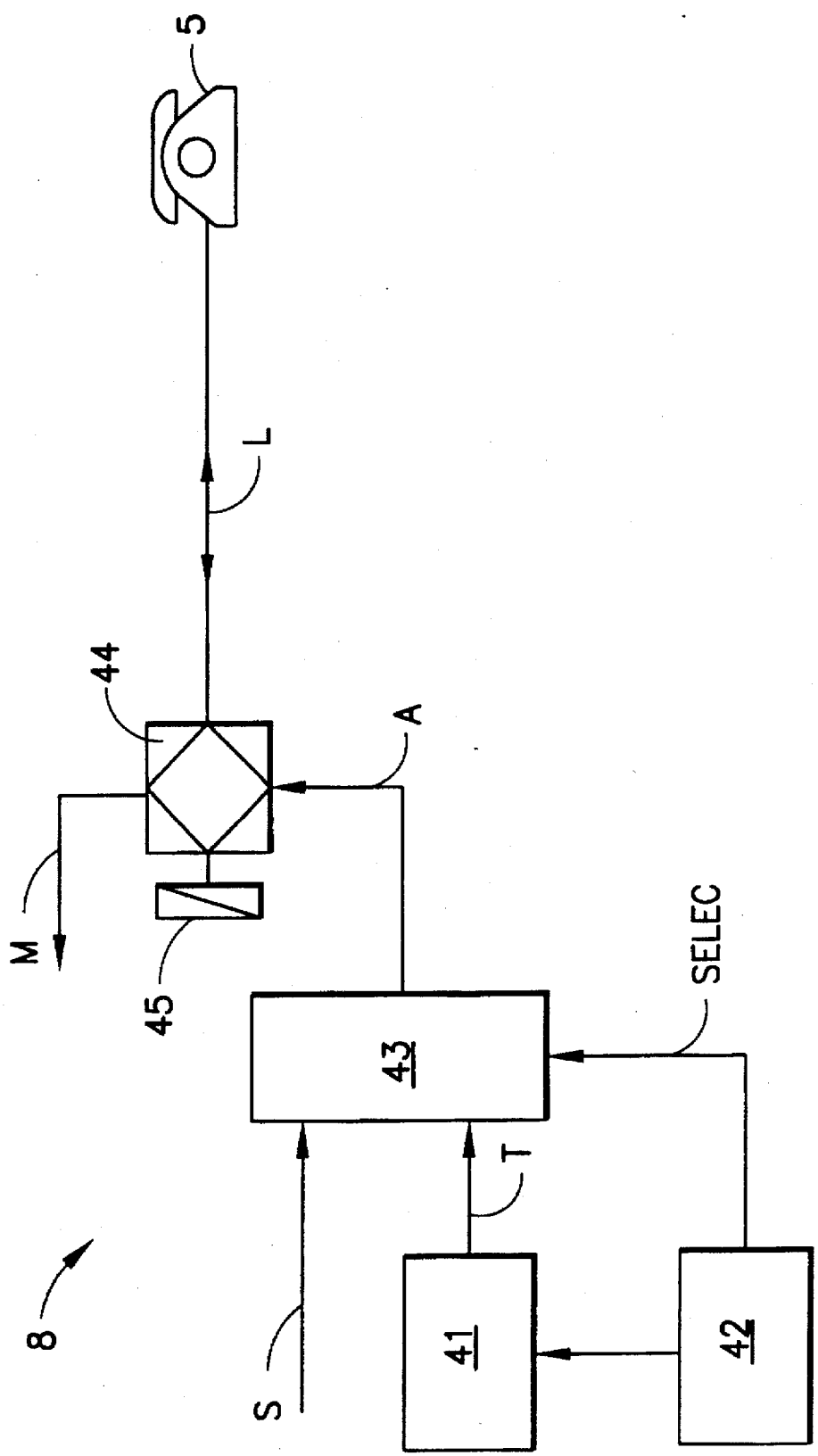
FIG. 2 shows part of the tone generating module and line matching module to which the telephone set is connected.

To overcome the uncertainty arising from this possible situation, FIG. 2 shows the final stage 8 of the line interface included in the fixed cellular terminal 4 that connects this terminal to a telephone terminal 5 by means of the subscriber line L.

This terminal incorporates a control circuit 42 that receives information from other parts of it in order to indicate to the tone generating means 41 the type of user signalling tone that has to be generated when there is an outgoing call attempt coming from a subscriber station 5 and directed to the network. For example, dial tone in the event that the subscriber 5 unhooks the terminal and it is possible to make calls over the network, or busy tone in the case that there is no available line, etc. In addition, according to the invention, there is an additional tone which is the emergency call dial tone. This is indicated to the tone generating means 41 via a control circuit 42 when the SIM card is not operational. This permits the subscriber to identify this situation and act in consequence (call to repair service centre, updating of SIM, etc.), and also to have available the emergency call service if required.

The control circuit 42 also has another selection output SELEC that is applied to multiplexing means 43 that produce a signal A at its output that can be the tone signal T generated by the tone generating means 41 or the audio reception signal S coming from the baseband part of the fixed cellular terminal 4. When the communication is set up, it will be the audio reception signal S that appears at the output of the multiplexing means 43, while in all other situations it will be the tone signal T that does so, as long as the telephone is off-hook.

The output signal A from the multiplexing means 43 is applied to one of the inputs of a hybrid coil 44 which directs this signal A towards the subscriber line L to which the telephone terminal 5 is connected. In like fashion the signal coming from the telephone terminal 5 destined for the fixed cellular terminal 4 over the subscriber line L arrives at the hybrid coil 44 and is directed, via another output of the latter, as the audio transmission signal M, to the baseband part of the fixed cellular terminal 4.

To compensate for the effect of the hybrid coil 44, there is also a matching load 45 that permits balancing of the load of the subscriber line L so that the output signal A of the multiplexing means 43 is applied entirely to the subscriber line L and is not coupled into the baseband as an audio transmission signal M and that the signal coming from the telephone terminal is sent to the baseband part as the audio transmission signal M and there is no shunting into the multiplexing means 43 nor return echo to the telephone terminal 5.

What is claimed is:

1. A fixed cellular terminal (4) for use in a cellular mobile network (CS) that communicates, via radio, with at least one base station (3) in order to provide voice and/or data communications services to at least one subscriber terminal (5) that could connect directly to a public switched network, and which in addition to the basic communications service also supports an emergency call service when such calls are made from the subscriber terminal, said fixed cellular terminal including means (41) to generate one of a plurality of user signalling tones directed to the subscriber terminal for indicating line avability for dialing a telephone number and characterised in that said means (41) also has means for generating an emergency call dial tone, different from the one of a plurality of user signalling tones initially present; a control circuit (42), connected to said means for generating one of a plurality of user signalling tones initially present, so as to control said means to generate one of a plurality of user signalling tones or the emergency dial tone, so that the emergency dial tone is generated when the control circuit determines that only emergency calls can be placed through the fixed cellular terminal when said control circuit determines that authorized subscriber identification has not been entered; and means for interfacing the generated emergency call dial tone to the subscriber terminal.

2. A fixed cellular terminal according to claim 1, characterised in that the emergency call dial tone is generated by the means for generating user signalling tones when a call process is initiated by the subscriber terminal connected to the fixed cellular terminal through the interfacing means.

3. A fixed cellular terminal (4) for use in a cellular mobile network (CS) that communicates, via radio, with at least one base station (3) in order to provide communication services to at least one subscriber terminal (5) that could connect directly to a public switched network, and which in addition to the basic communication service also supports an emergency call service when such calls are made from the terminal (5), comprising:

A) tone generating means (41) that generates at least one of two dial tones at an output (T); namely a first dial tone indicative of normal subscriber line communication service or a second dial tone indicative of emergency call service;

B) a control circuit (42) connected to the tone generating means (41) for controlling the generation of the first or second dial tone at the output (T) of the tone generating means, depending upon the current status of the fixed cellular terminal; and C) means (43, 44) for interfacing the generated dial tone to the subscriber terminal, wherein the control circuit commands the tone generator means to generate the second dial tone, indicative of emergency call service, whenever only emergency calls are possible through the fixed cellular terminal when said control circuit determines that authorized subscriber identification has not been entered.

4. A fixed cellular terminal as defined in claim 3, wherein the means for interfacing the selected tone to the subscriber terminal includes a hybrid coil (44) for receipt of the tone and its presentation, via a subscriber line (L), to the subscriber terminal as well as for connection of the subscriber line to a transmission line (M) for communication between the subscriber terminal and the fixed cellular terminal.

5. A fixed cellular terminal as defined in claim 4, further comprising a load (45) connected to the hybrid coil (44) so as to balance the subscriber line so that the generated tones are submitted to the subscriber terminal and not to the transmission line and such that signals on the transmission line (M) are presented to the subscriber terminal, and vice versa, and not to the tone generating means and the control circuit.

6. A fixed cellular terminal as defined in claim 5, wherein the interfacing means includes multiplexing means (43), under control of the control circuit (42), said multiplexing means (43) receiving an audio reception signal (S) from the baseband part of the fixed cellular terminal and the output (T) of the tone generating means (41), the multiplexing means having an output signal (A) that is the generated dial tone of the tone generating means (41) during call setup, and is the audio reception signal (S) after a call setup has been established.

7. A fixed cellular terminal as defined in claim 3, wherein the interfacing means includes multiplexing means (43), under control of the control circuit (42), said multiplexing means (43) receiving an audio reception signal (S) from the baseband part of the fixed cellular terminal and the output (T) of the tone generating means (41), the multiplexing means having an output signal (A) that is the generated dial tone of the tone generating means (41) during call setup, and is the audio reception signal (S) after a call setup has been established.

* * * * *

UNITED STATES PATENT AND TRADEMARK OFFICE
CERTIFICATE OF CORRECTION

PATENT NO. : 5,680,439
DATED : October 21, 1997
INVENTOR(S) : Jose Maria GARCIA AGUILERA et al It is certified that error appears in the above-identified patent and that said Letters Patent is hereby corrected as shown below:

On the title page, item [54] and column 1, line 1, "TECHNICAL" should read --TERMINAL--.

Signed and Sealed this

Fourteenth Day of April, 1998

Attest:

BRUCE LEHMAN

Attesting Officer

Commissioner of Patents and Trademarks